B. W. FRAMPTON.
MACHINE FOR HANDLING BOTTLES AND BOTTLE CASES.
APPLICATION FILED DEC. 8, 1920.
1,433,128.
Patented Oct. 24, 1922.
7 SHEETS—SHEET 1.
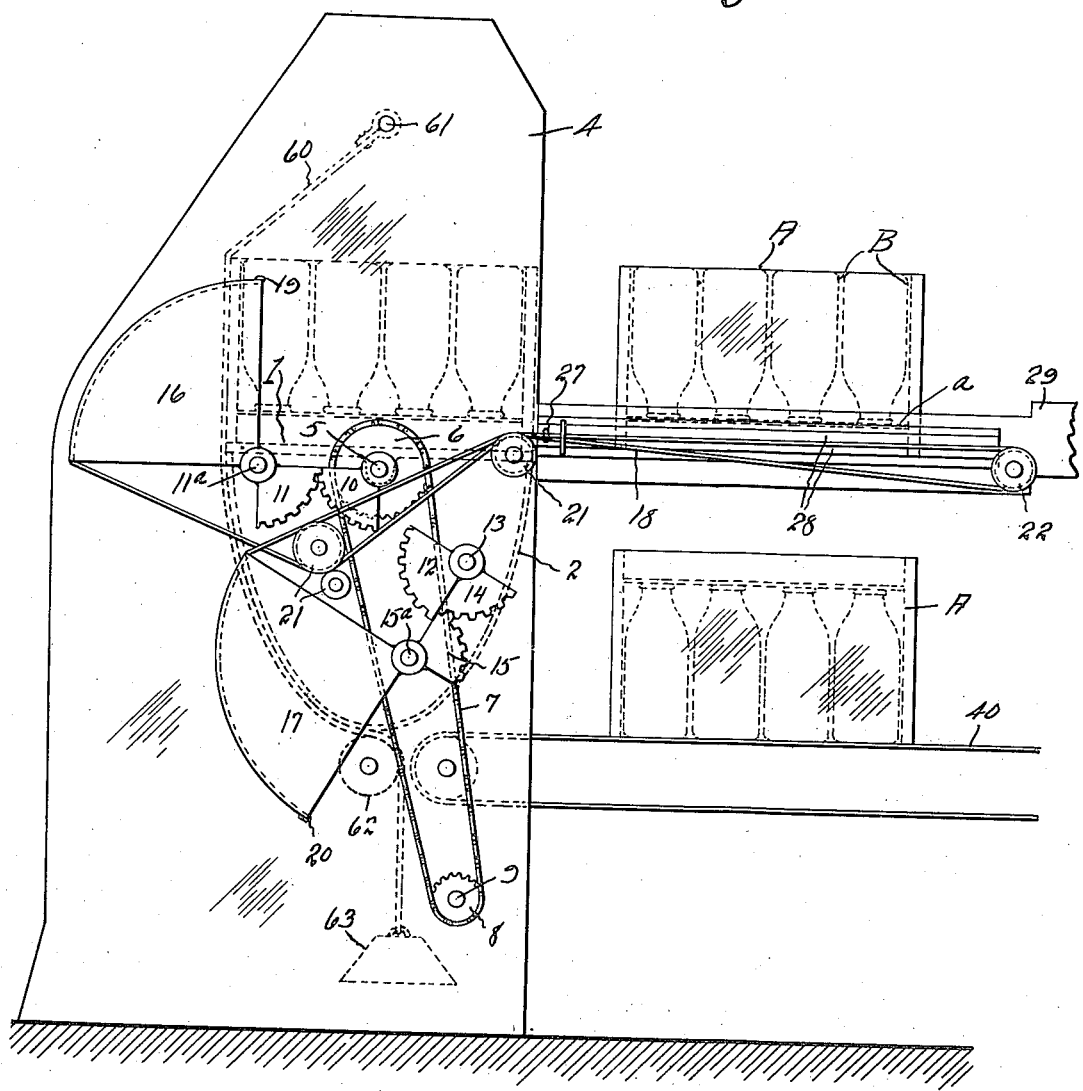

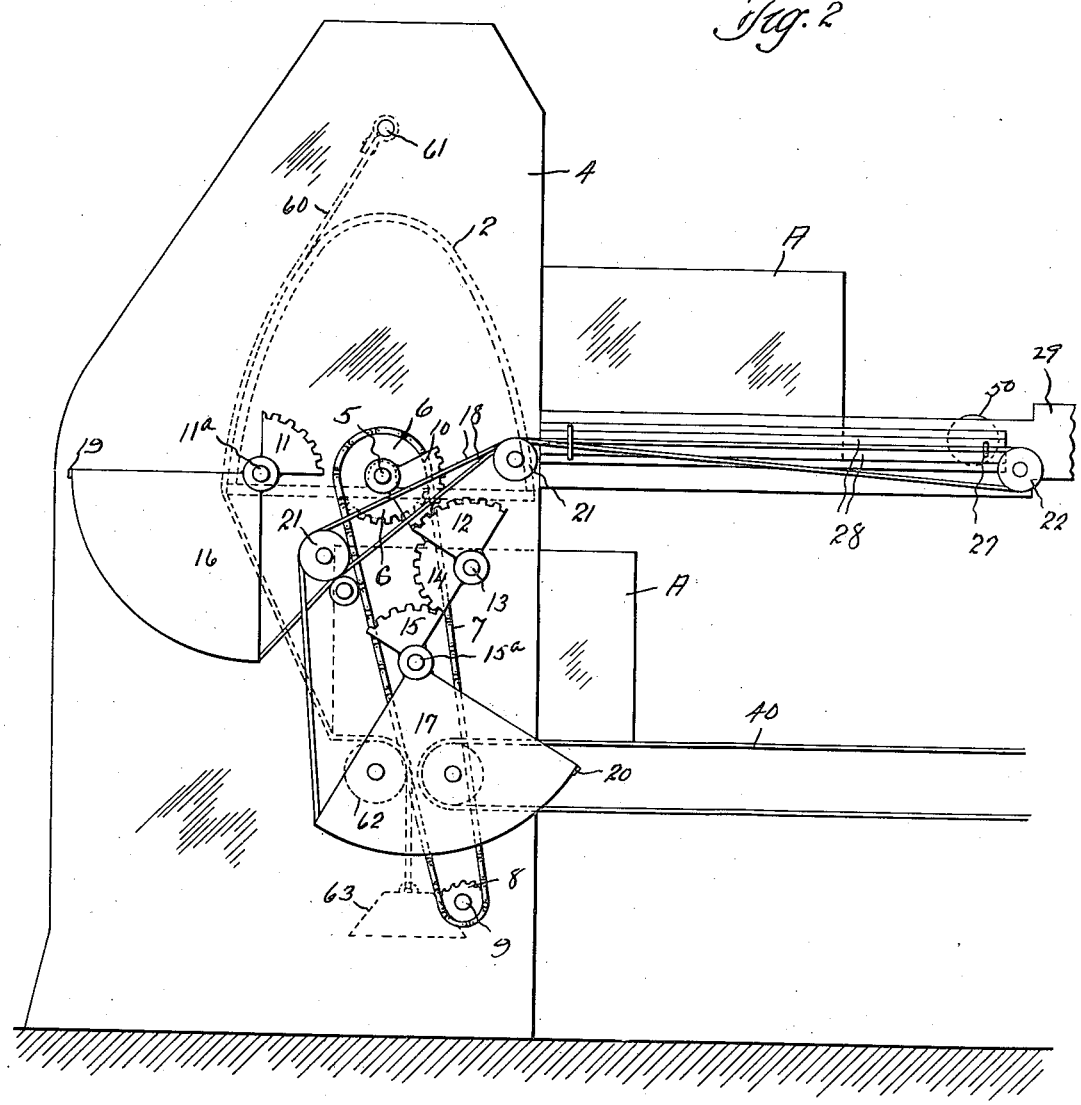

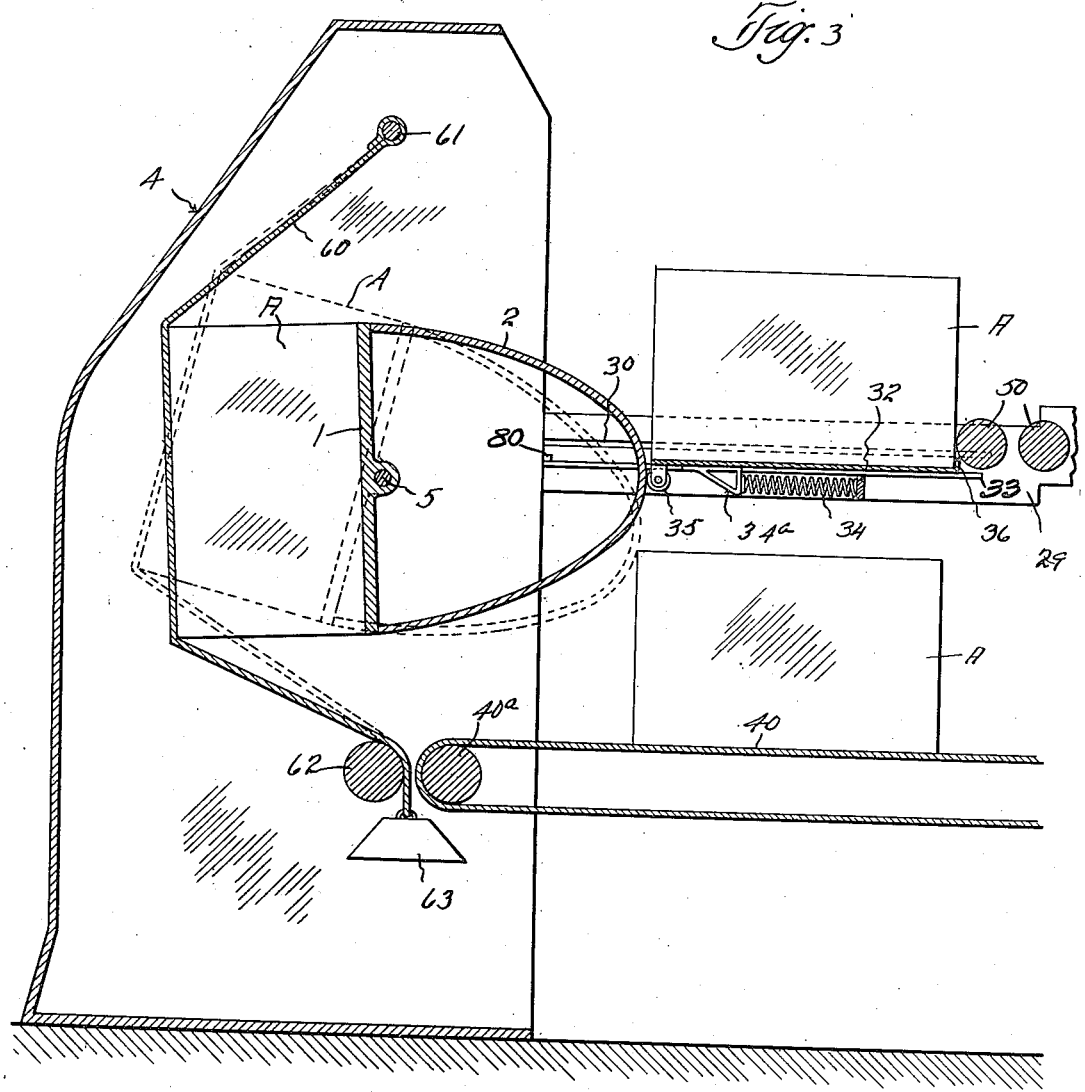

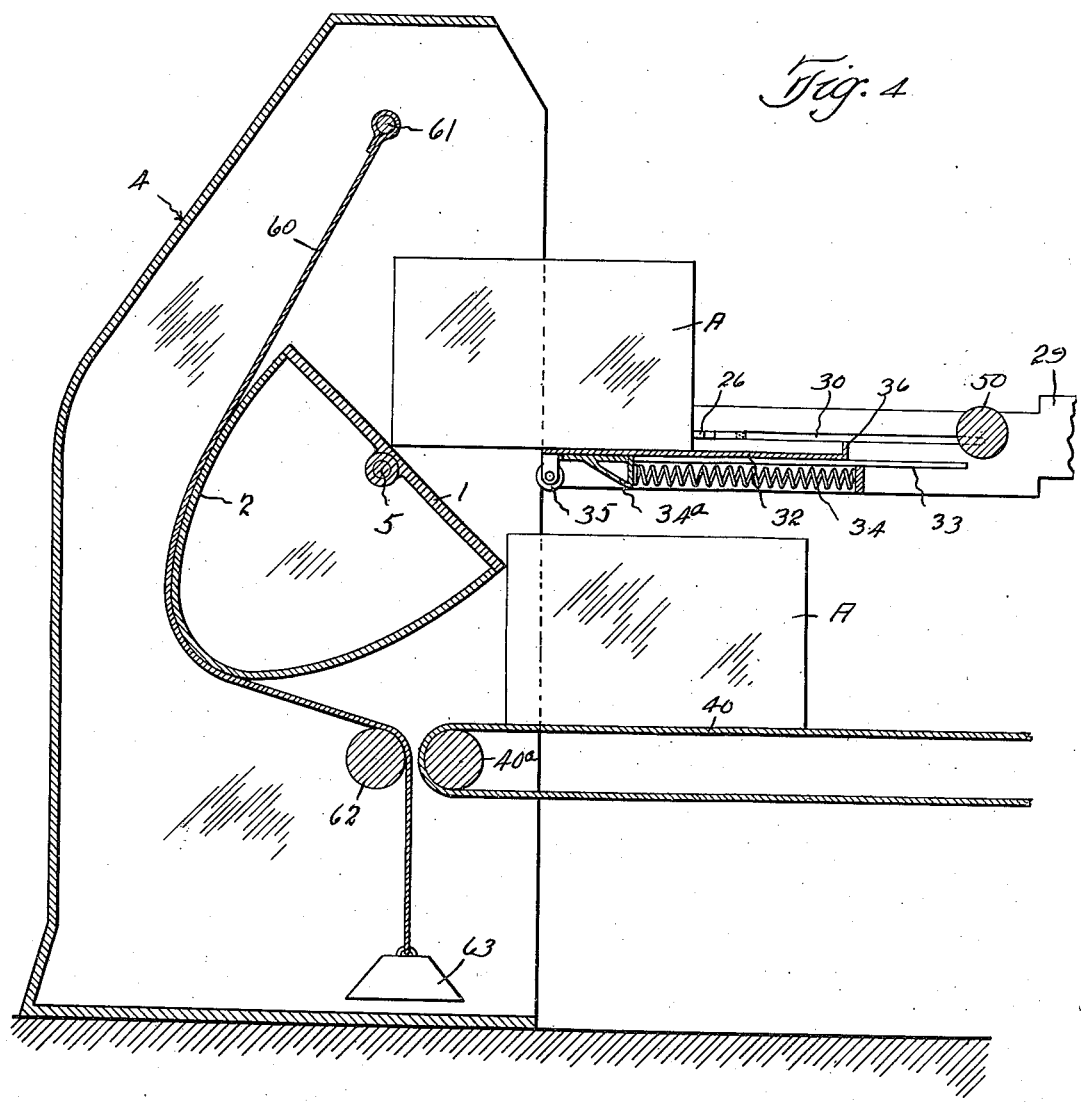

B. W. FRAMPTON.
MACHINE FOR HANDLING BOTTLES AND BOTTLE CASES.
APPLICATION FILED DEC. 8, 1920.
1,433,128.
Patented Oct. 24, 1922.
7 SHEETS—SHEET 5.
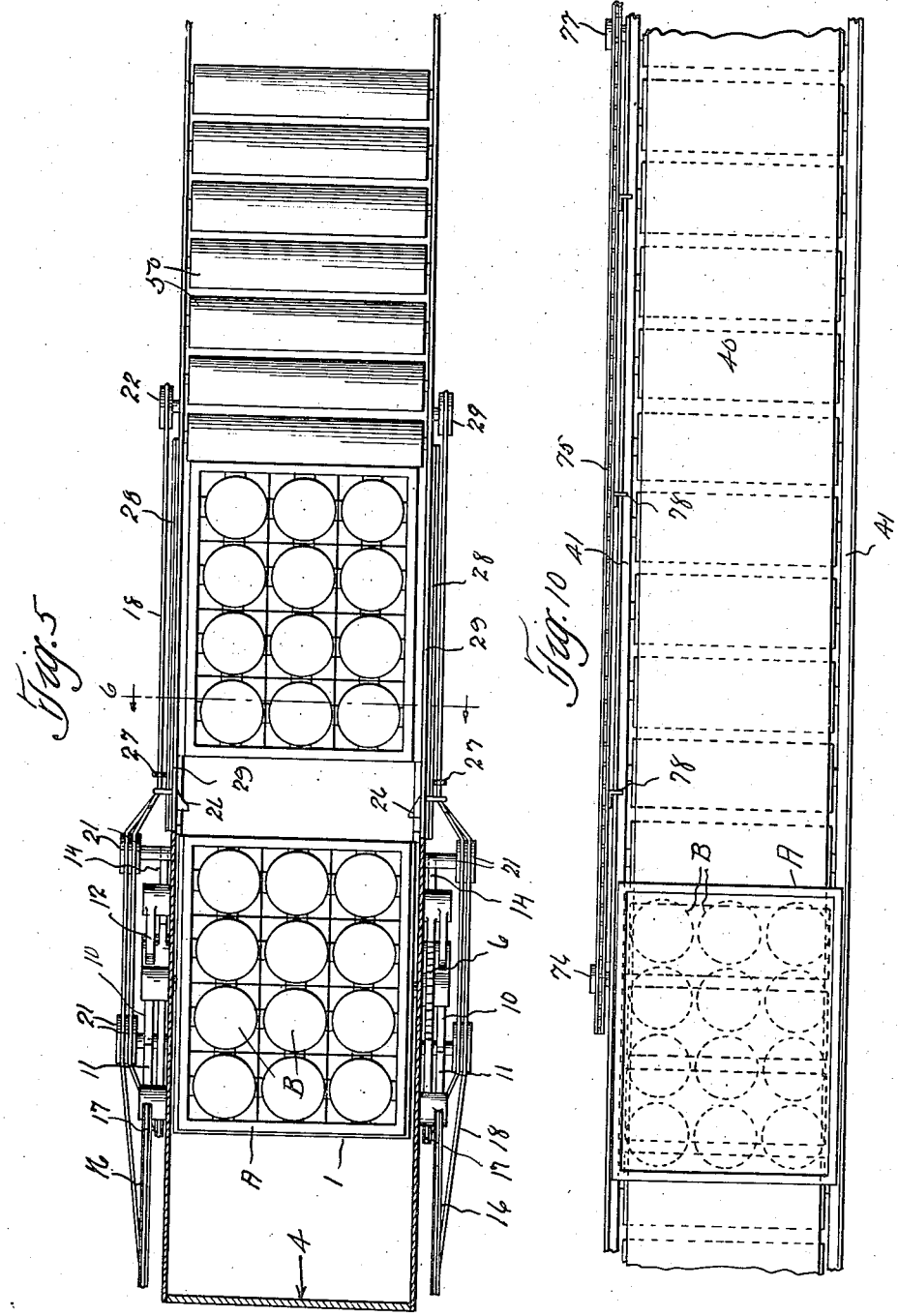

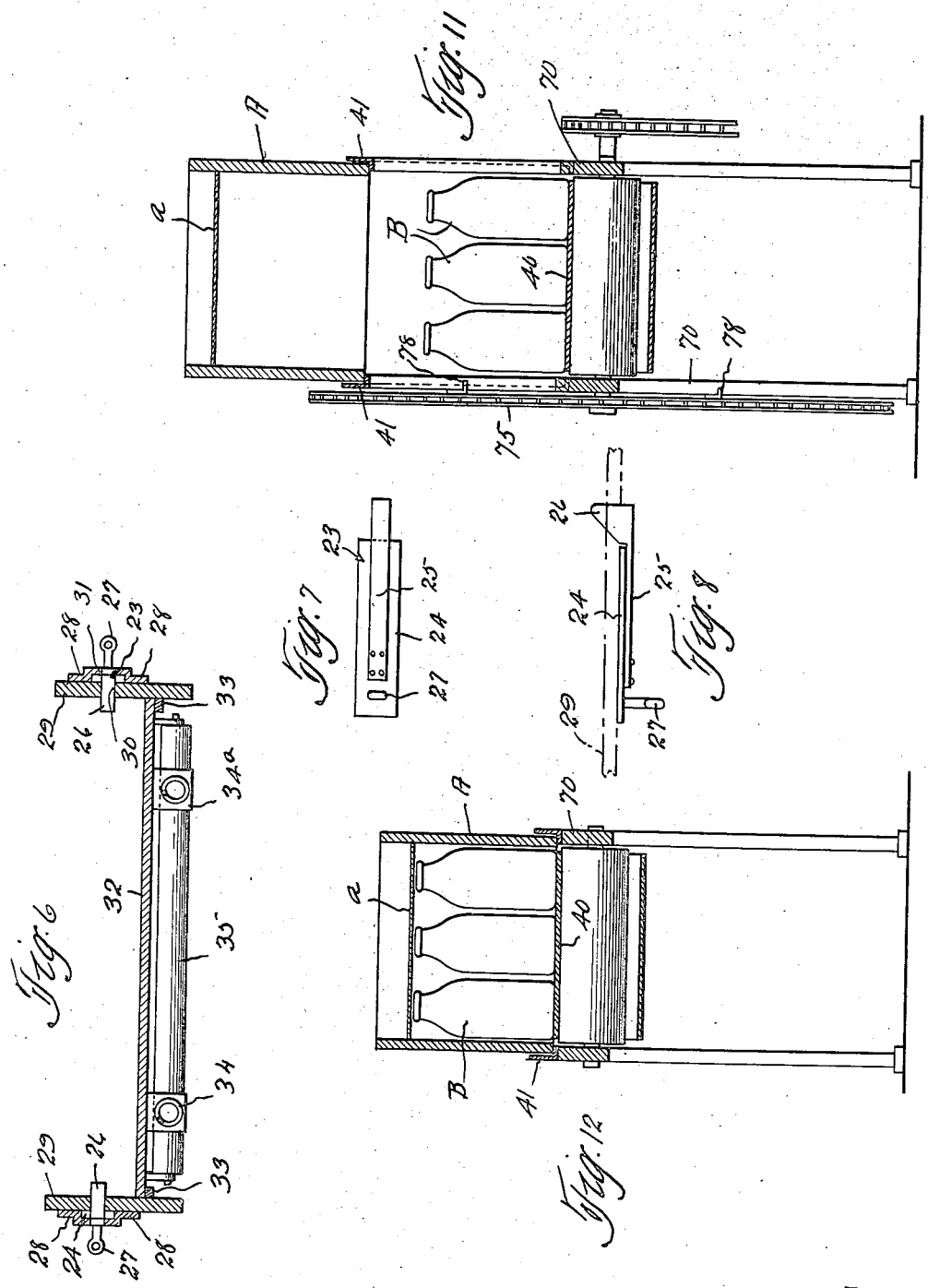

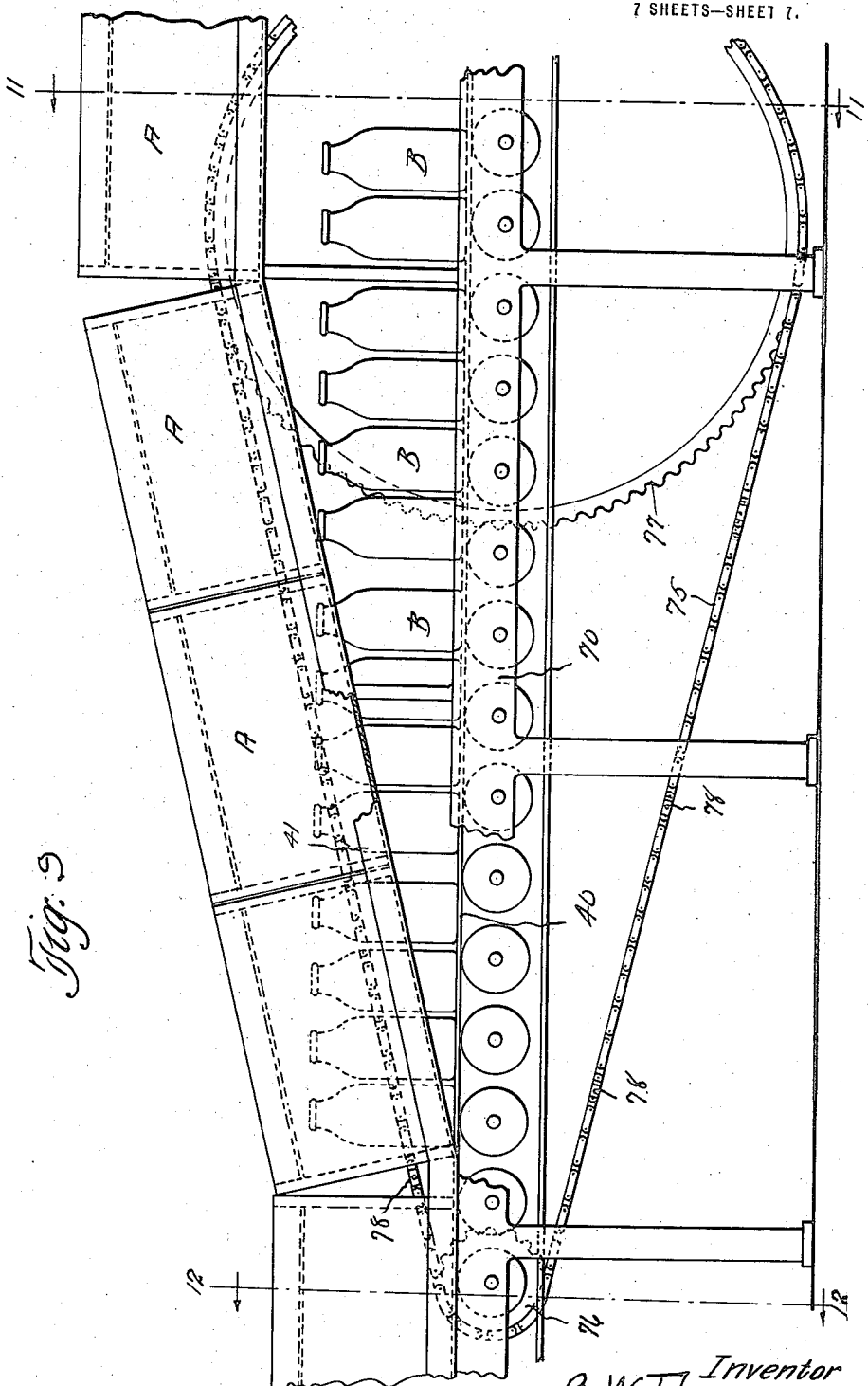

Patented Oct. 24, 1922.

1,433,128

UNITED STATES PATENT OFFICE.

BENJAMIN W. FRAMPTON, OF CLEVELAND, OHIO.

MACHINE FOR HANDLING BOTTLES AND BOTTLE CASES.

Application filed December 8, 1920. Serial No. 429,149.

*To all whom it may concern:*

Be it known that I, BENJAMIN W. FRAMPTON, a citizen of the United States, residing at Cleveland, in the county of Cuyahoga and State of Ohio, have invented certain new and useful Improvements in Machines for Handling Bottles and Bottle Cases, of which the following is a specification.

This invention relates to machines for handling bottles and bottle cases in dairy and other similar plants, and has for one of its objects to provide improved means for turning the bottles and bottle cases right side up preparatory to refilling.

It may be explained that in most bottle washing plants the bottles in cases containing same are washed in inverted position, after which, before passing to the refilling machines, it requires considerable labor to restore the bottles and cases to upright or proper position before refilling.

An object of the present invention is to produce a machine which will reverse the inverted bottles and cases to upright position, and which will then remove the cases from the bottles so that the latter can be delivered to the filling machines. The machine, therefore, comprises two parts, one the reversing mechanism, and the other the mechanism for lifting the cases from the upright bottles. The machine is automatic, and will continue to perform its functions as long as the bottles and cases are supplied or fed thereto. The reversing mechanism includes a revolving platform on which the cases and bottles are held while being swung through 180°, after which the reversed case is discharged on to a conveyor, and the revolving platform then picks up the next case. The mechanism for removing the cases from the bottles after being reversed comprises an inclined guideway up which the cases run, leaving the upright bottles standing on a conveyor leading for example to the filling machine.

The details of the invention will be more evident from the following description and the accompanying drawings, in which Fig. 1 is a side elevation of the part of the machine for turning the bottles and cases. Fig. 2 is a similar view showing the parts in a different position. Fig. 3 is a vertical section showing the parts in still another position. Fig. 4 is a section similar to Fig. 3 with the parts in position with the platform receiving one case and discharging another. Fig. 5 is a top plan of the mechanism shown in the preceding figures. Fig. 6 is a section on the line 6—6 of Fig. 5. Fig. 7 is a side elevation of a catch device to advance the cases. Fig. 8 is a top edge view of Fig. 7. Fig. 9 is a side elevation of that part of the machine in which the cases are lifted from the bottles after being inverted. Fig. 10 is a plan of the parts shown in Fig. 9. Figs. 11 and 12 are sections on the lines 11—11 and 12—12 respectively of Fig. 9.

Referring specifically to the drawings, 50 indicates rollers supported between side bars 29 down which the cases A containing bottles B are fed from a washing machine not shown. These boxes or cases are upright, with the bottles in inverted or draining position therein, the mouths of the bottles resting on the bottoms $a$ of the cases. From the rollers 50 the cases with the bottles therein drop or pass on to a reciprocating feeding plate 32, which is provided at its rear edge with a ledge 36 to engage behind the cases, and this plate slides on strips 33 attached to the sides 29 of the delivering conveyor, and carries at its front end a roller 35. Springs 34 are coiled in compression behind lugs 34$^a$ on the bottom of the plate 32, and tend to advance or slide said plate forwardly, to the position shown in Fig. 4, although the plate may be pushed back to the position shown in Fig. 3 by means to be described. In long slots 30 in the opposite side walls of the frame is mounted a pair of catches indicated as a whole at 23. Each catch consists of a plate 24 to which is attached a flat spring 25 carrying an inclined lug 26, and having a projection 27 to which a cable 18 is attached. Each plate 24 slides in a guideway formed by strips 28 on the outside of the wall 29, the inclined lug 26 projecting through the slot 30, and the post or projection 27 extending through the slot 31 formed between the strips 28. These catches act in the operation of the machine to engage behind the cases A and deliver the same from the plate 32 on to the reversing or turning platform 1.

This platform 1 is mounted to rotate on a shaft 5 between the side walls 3 of a housing 4. A sprocket 6 is mounted on one end of the shaft 5, and is driven by a chain 7 from a sprocket 8 on a power shaft 9. A segmental gear 10 is also mounted on each end of the shaft 5 and engages with segment gears 11 and 12. The latter gear is mounted on a shaft 13 which also carries a segment gear 14 which meshes with a segment gear 15. The segment gears 11 and 15 are mounted on suitable shafts 11ª and 15ª and carry segmental pulleys 16 and 17 respectively, to which are respectively connected at 19 and 20 opposite ends of the cable 18, which passes thence over guide pulleys 21 and around a reversing pulley 22. These parts are duplicated at opposite sides of the housing 4, as shown in Fig. 5.

Attached to the back of the revolving platform 1 is a curved plate or form 2 which acts as a cam plate by wiping against the roller 35 to push back the plate 32 to the position where it picks up a case A, as shown in Fig. 3. This form also wipes against or along a flexible apron 60 which is suspended from a rod 61 between the sides 3 of the housing and extends over a roller 62 which is in line with a belt conveyor 40 to be further described, the apron being placed under tension by a weight 63 at the lower end thereof. This apron has or serves the function of confining or holding the bottle cases on the platform 1 during the turning operation, as will appear from Fig. 3, the apron yielding to accommodate the travel of the bottle case, the weight rising and falling as the cases are turned with the platform. The operation will be evident from an inspection of Figs. 3 and 4.

When after receiving a case the platform is turned a half turn, the case is delivered therefrom onto a belt conveyor 40 which runs over rollers 40ª in a suitable frame 70, the bottles resting on the belt in upright or proper position. The frame of this conveyor is provided at each side with an inclined angle runway or track 41, the lower flanges of which angles are properly disposed to pass under the side edges of the cases A, and as the cases are advanced act to lift the cases from the bottles which remain on the conveyor belt, as indicated in Figs. 9 and 12, the bottles being delivered from the conveyor belt to a filling machine, not shown, or otherwise as desired, and the boxes being delivered separately to a suitable place. It will be understood that the travel of the boxes or cases A up the incline causes them to lift from the bottles, the cases being then bottom upwards. A chain 75, running on sprockets 76 and 77, and having lugs 78, which are adapted to engage the cases A, attached thereto at spaced intervals, is provided to force the cases A up the inclined runways 41.

In the operation of the machine, starting from the position shown in Fig. 3, the cam form 2 has pressed back the plate 32 and the case A with the bottles therein is delivered on to said plate from the rolls 50. Then as the form 2 turns the springs 34 advance the plate 32 to the limit permitted by a stop 80 on the frame. Meanwhile the swing of the segment pulley 17 caused by the engagement of the segment gears 10, 12, 14 and 15 has pulled the cables 18 and the catches 23 attached thereto backwardly, as shown in Fig. 2, and this is followed by the engagement of the segment gears 10 and 11 and the swing of the segment pulley 16 to the position shown in Fig. 1, and, the catch heads 26 being then engaged behind the case B, the catches are pulled forward and the case is slid from its position on the plate 32 on to the revolving platform 1 which is then turning to upright position as shown in Figs. 4 and 1. This platform then continues to turn and the case is reversed, occupying the positions shown in Figs. 3 and 2 in succession, and while passing around the case is held to the platform and retained in position by the pressure of the apron 60 against the same, as clearly shown in Fig. 3, this apron also acting to guide and advance the case from its position under the platform 1, which it then occupies, onto the belt conveyor 40 which picks it up. And the operation is repeated indefinitely, the cases being fed one by one to the revolving platform, reversed, and delivered onto the discharging conveyor.

The cases with the bottles right side up are then carried along by this conveyor until they reach the inclined track 41 which picks up the cases and lifts the same from the bottles as shown in Fig. 9 leaving the bottles standing on the conveyor 40 for further operations.

The apparatus will be found very efficient for conducting the reversing operations of bottles and cases and will save much of the hand labor now employed for performing these operations.

It may be noted that the apron 60, in addition to holding the cases on the platform 1, as they are being reversed, also holds the bottles B in the cases, until they pass on the delivery conveyor 40. The segment gears are so constructed that they produce an alternate reciprocation of the pick up catches 23, properly timed to advance the cases and deliver one case onto the platform 1 at each rotation thereof.

The invention is not limited to the particular mechanism shown, but may be varied in many ways, in actual construction, within the scope of the following claims.

I claim:

1. A reversing mechanism for bottle cases, comprising a revolving platform, means to feed the cases successively onto said platform at each revolution thereof, and means to hold the cases on the platform and the bottles in the cases until they are inverted.

2. A reversing mechanism for bottle cases, comprising a revolving platform, means to feed cases containing bottles one by one onto said platform at each revolution thereof, and means to hold the cases on the platform and the bottles in the cases, until the cases are inverted.

3. The mechanism claimed in claim 1, in combination with a conveyor located in position to receive the cases from said platform after they are inverted.

4. A reversing mechanism for bottle cases, comprising a revolving platform, a reciprocating feeding plate adapted to advance the bottle cases toward the platform in succession at each revolution of the latter, means to reciprocate the plate, means to deliver the cases from the plate onto the platform, and means to hold the cases on the platform while it is revolving, until the cases are inverted.

5. A reversing mechanism for bottle cases, comprising a revolving platform, a reciprocating feeding plate adapted to advance the bottle cases toward the platform, in succession at each revolution of the latter, means to reciprocate the plate, means to deliver the cases from the plate onto the platform, and means to hold the cases on the platform while it is revolving, until the cases are inverted, said means including a yieldable apron which presses against the cases while the platform is turning from upright to inverted position.

6. In a reversing mechanism for bottle cases, the combination of an upper feeding conveyor and a lower delivering conveyor, a revolving platform onto which the cases are delivered in succession by the upper conveyor and adapted to deliver the cases onto the lower conveyor, and means to hold the cases on the platform while they are being inverted.

7. In a reversing mechanism for bottle cases, the combination of an upper feeding conveyor and a lower delivering conveyor, a revolving platform onto which the cases are delivered in succession by the upper conveyor and adapted to deliver the cases onto the lower conveyor, and means to hold the cases on the platform while they are being inverted, said means comprising a yielding apron which presses against the cases during the turning movement, the lower part of the apron being located adjacent to the end of the delivery conveyor, whereby to direct the inverted cases thereto.

8. The combination in a reversing mechanism for bottle cases, of a revolving platform, a sliding plate movable toward and from said platform, means carried by the platform to slide the plate, means to shift the cases from the plate onto the platform, and means to hold the cases on the platform while the latter is revolving.

9. A reversing mechanism for bottle cases, having in combination a revolving platform, a feeding conveyor leading thereto, a reciprocating plate movable between the conveyor and the platform and adapted to advance the cases toward the platform catch devices engageable with the cases and movable back and forth to advance the cases from the plate onto the platform, means to reciprocate the catch devices, and means to confine the cases to the platform while they are being inverted.

10. In a mechanism for reversing bottle cases the combination of a revolving platform, a conveyor leading thereto and provided with a reciprocating plate adapted to advance bottle cases from the end of the conveyor toward the platform, a cam carried by the platform and operatively connected to the plate to cause reciprocation thereof, means to shift the cases from the plate onto the platform, and means to hold the cases on the platform while they are being inverted.

11. In a reversing mechanism for bottle cases the combination of a revolving platform, means to feed the cases successively onto said platform, and means to hold the cases on the platform while they are being inverted, comprising a flexible yielding apron, against which the cases wipe as they are being inverted.

12. In a reversing mechanism for bottle cases, the combination with an upper feeding conveyor, a lower delivering conveyor, and a revolving platform located adjacent the end of the feeding conveyor and above the end of the delivering conveyor, the feeding conveyor including means to successively advance cases onto the platform, and means to hold the cases on the platform while it is being inverted to deposit the same onto the delivery conveyor.

13. In a reversing mechanism for bottle cases, the combination with an upper feeding conveyor, a lower delivering conveyor, and a revolving platform located adjacent the end of the feeding conveyor and above the end of the delivering conveyor, the feeding conveyor including means to successively advance cases onto the platform, and means to hold the cases on the platform while it is being inverted to deposit the same onto the delivery conveyor, said means comprising a flexible yielding apron suspended vertically beside the platform and confined near its lower end to a position adjacent the end of the delivering conveyor, to direct the cases onto the latter after they are inverted.

In testimony whereof, I affix my signature in presence of two witnesses.

BENJAMIN W. FRAMPTON.

Witnesses:
JOHN A. BOMMHARDT,
BESSIE F. POLLAK.